United States Patent
Okumura et al.

(10) Patent No.: US 8,511,290 B2
(45) Date of Patent: Aug. 20, 2013

(54) EGR VALVE DEVICE

(75) Inventors: Tomohiro Okumura, Tokyo (JP);
Sotsuo Miyoshi, Tokyo (JP); Haruo Watanuki, Tokyo (JP); Satoru Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 340 days.

(21) Appl. No.: 12/999,708

(22) PCT Filed: Aug. 14, 2009

(86) PCT No.: PCT/JP2009/003896
§ 371 (c)(1),
(2), (4) Date: Dec. 17, 2010

(87) PCT Pub. No.: WO2010/041368
PCT Pub. Date: Apr. 15, 2010

(65) Prior Publication Data
US 2011/0088670 A1    Apr. 21, 2011

(30) Foreign Application Priority Data
Oct. 9, 2008    (JP) ................. 2008-262916

(51) Int. Cl.
*F02M 25/07*    (2006.01)

(52) U.S. Cl.
USPC ................. 123/568.26; 123/568.11

(58) Field of Classification Search
USPC ............. 123/586.11, 568.21, 188.1, 188.8, 123/586.21, 568.26; 251/333, 328
See application file for complete search history.

(56) References Cited

U.S. PATENT DOCUMENTS

| | | | |
|---|---|---|---|
| 2,672,856 A * | 3/1954 | Wagner | 123/188.8 |
| 3,170,452 A * | 2/1965 | Dobovan | 123/188.8 |
| 4,108,132 A * | 8/1978 | Hayashi | 123/188.8 |
| 4,236,495 A * | 12/1980 | Rosan, Jr. | 123/188.8 |
| 4,522,161 A * | 6/1985 | Slee | 123/41.85 |
| 4,676,482 A * | 6/1987 | Reece et al. | 251/365 |
| 6,378,840 B1 | 4/2002 | Watanabe et al. | |
| 7,013,880 B2 * | 3/2006 | Watanuki et al. | 123/568.2 |
| 2005/0199226 A1 | 9/2005 | Watanuki et al. | |
| 2006/0185652 A1 | 8/2006 | Tsuge et al. | |
| 2008/0098999 A1* | 5/2008 | Melhem et al. | 123/568.18 |
| 2008/0230040 A1* | 9/2008 | Wilson et al. | 123/568.18 |

FOREIGN PATENT DOCUMENTS

| | | |
|---|---|---|
| CN | 2674233 Y | 1/2005 |
| DE | 19644356 C2 | 2/1999 |
| JP | 2001-82625 A | 3/2001 |
| JP | 2005-256803 A | 9/2005 |
| JP | 2006-258283 A | 9/2006 |
| KR | 2003-0094733 A | 12/2003 |

* cited by examiner

Primary Examiner — Stephen K Cronin
Assistant Examiner — Arnold Castro
(74) Attorney, Agent, or Firm — Birch, Stewart, Kolasch & Birch, LLP

(57) ABSTRACT

An EGR valve device includes a housing having an exhaust gas passage formed inside, a support shaft slidably supported within the housing through a bearing, a valve disposed on the support shaft to open and close the exhaust gas passage, an urging member for urging the support shaft in a direction to close the valve, a valve seat, insert-cast integral with the housing, for closing the exhaust gas passage by abutting against the valve, and an actuator for driving the support shaft in a direction to open the valve, wherein a plurality of recesses or projections are provided axisymmetrically or uniformly in the peripheral portion of the valve seat to be insert-cast.

7 Claims, 7 Drawing Sheets (a)

(b)

(a)

(b)

(c)

(a)

(b)

(c)

(d)

(a)

(b)

(c)

EGR VALVE DEVICE

TECHNICAL FIELD

The present invention relates to an EGR (Exhaust Gas Recirculation) valve device for leading part of exhaust gas after burning in an internal combustion engine to an intake side thereof to be circulated.

BACKGROUND ART

As disclosed in Patent Document 1, for example, an EGR valve device has one or more exhaust gas inlet ports and one or more exhaust gas outlet ports, and includes: a valve housing forming an exhaust gas passage connected to those exhaust gas inlet ports and exhaust gas outlet ports; valve seats disposed on the inner periphery of the valve housing; a valve shaft assembled to the valve housing; and valves that are mounted to the valve shaft and simultaneously abut against their respective valve seats when the valve shaft moves in a direction; when the valves seated against their respective valve seats are opened, the exhaust gas exhausted from the exhaust gas outlet port is circulated to be aspirated to an engine. As shown in FIG. 7, for example, a valve seat 140 of the EGR valve device is a flat plate made of generally disk-shaped stainless steel or the like having a hole formed at the center thereof, and is secured to a housing 110 made of aluminum or the like by integrally fixing the peripheral portion of the valve seat to the housing by insert-casing or the equivalent method.

In such an EGR valve device, the temperature of an exhaust gas passage sometimes reaches about $-40°$ C. in a low temperature, and reaches from about $100°$ C. to $700°$ C. in a high temperature according to the conditions of the engine; there can develop a large gap between components that are insert-cast by materials having a linear expansion coefficient different from each other. For example, in a case where placing the components under a low temperature=$-40°$ C. for one hour and a high temperature=$+350°$ C. for one hour is defined as one cycle, when 100 cycles of this are carried out, there may develop a significant gap s0 of about 100 μm between the insert-cast components employing the materials having a linear expansion coefficient different from each other, and the gap s0 may cause the chatter of the valve seat 140.

PRIOR ART DOCUMENTS

Patent Documents

Patent Document 1: JP-A-2005-256803

SUMMARY OF THE INVENTION

Since the conventional EGR valve device is arranged as discussed above, and is affected by the temperature of an exhaust gas passage, there is a problem such that the chatter thereof can occur because of a difference in linear expansion coefficient between the material of a valve seat and that of a housing.

Moreover, the chattering of the valve seat can increase the leakage of exhaust gas during a valve-closed condition, and further cause falling off of the valve seat or the like, which may lead to a breakage thereof.

The present invention has been made to solve the above-mentioned problems, and an object of the present invention is to provide an EGR valve device where a valve seat is prevented from chattering, and also the leakage of exhaust gas and/or the damage of the valve seat are prevented.

The EGR valve device of the present invention is arranged such that a plurality of recesses or projections are provided axisymmetrically or uniformly in the peripheral portion of a valve seat to be insert-cast integral with a housing.

According to the EGR valve device of the invention, it is arranged such that the plurality of recesses or projections are provided axisymmetrically or uniformly in the peripheral portion of the valve seat to be formed integral with the housing. Thus, even if there is a difference in linear expansion coefficient between the housing and the valve seat, and the housing and the valve seat are subjected to a thermal history, a portion having a small gap between the both can be formed to thereby prevent the chattering of the valve seat, and also prevent the leakage of exhaust gas and/or the damage of the valve seat.

BEST MODE FOR CARRYING OUT THE INVENTION

An embodiment of the present invention will next be described with reference to the drawings in detail.

First Embodiment

Figure 1:
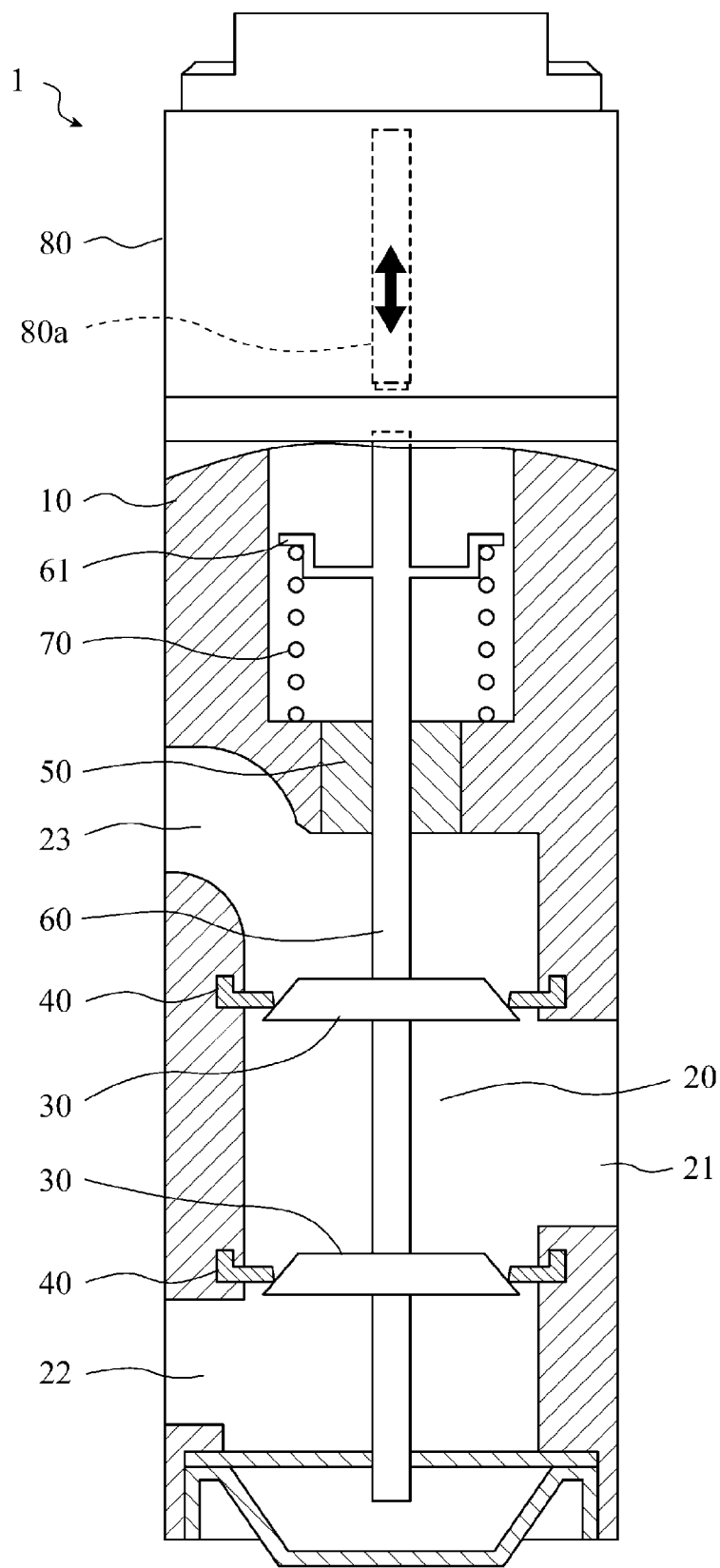
FIG. 1 is a partially cutaway longitudinal sectional view of an EGR valve in accordance with a first embodiment of the present invention.

FIG. 1 is a partially cutaway longitudinal sectional view of an EGR valve 1. A housing 10 of the EGR valve device 1 includes one exhaust gas inlet port 21 and two exhaust gas outlet ports 22, 23, and in an exhaust gas passage 20 for connecting those ports to each other, valve seats 40 are respectively provided in a part branching from the inlet port 21 to the outlet port 22 and a part branching from the inlet port 21 to the outlet port 23, and are formed integral with the housing by insert-casting. The details of the valve seat 40 will be discussed later.

A support shaft 60 is slidably attached in an axial direction through a bearing 50 on the central axis of the housing 10, and valves 30 are attached to the support shaft 60 to correspond to their respective valve seats 40. Further, a spring 70 (urging member) for normally urging the valve 30 in a valve-closing direction is provided between a holder 61 located at the upper portion of the support shaft 60, and the housing 10.

Moreover, a motor 80 as an actuator is attached to the housing 10, and the support shaft 60 is driven in the axial direction with a motor shaft 80a of the motor 80.

The EGR valve device 1 is arranged as discussed above. When an internal combustion engine (not shown) such as an engine operates, the motor 80 is driven, and the motor shaft 80a meshed with a tapped hole at the center of a rotor moves in the axial direction of the support shaft 60 by the rotation of the rotor. Further, the motor shaft 80a abuts against the top of the support shaft 60 to move the support shaft 60 in the axial direction against the urging force of the spring 70.

As the support shaft 60 moves, an open passage is formed between the valve 30 and the valve seat 40, and the opening degree of the exhaust gas passage 20 is adjusted by the travel of the support shaft 60 to adjust the amount of exhaust gas circulation.

Next, a description will be given of the valve seat 40.

Figure 2:
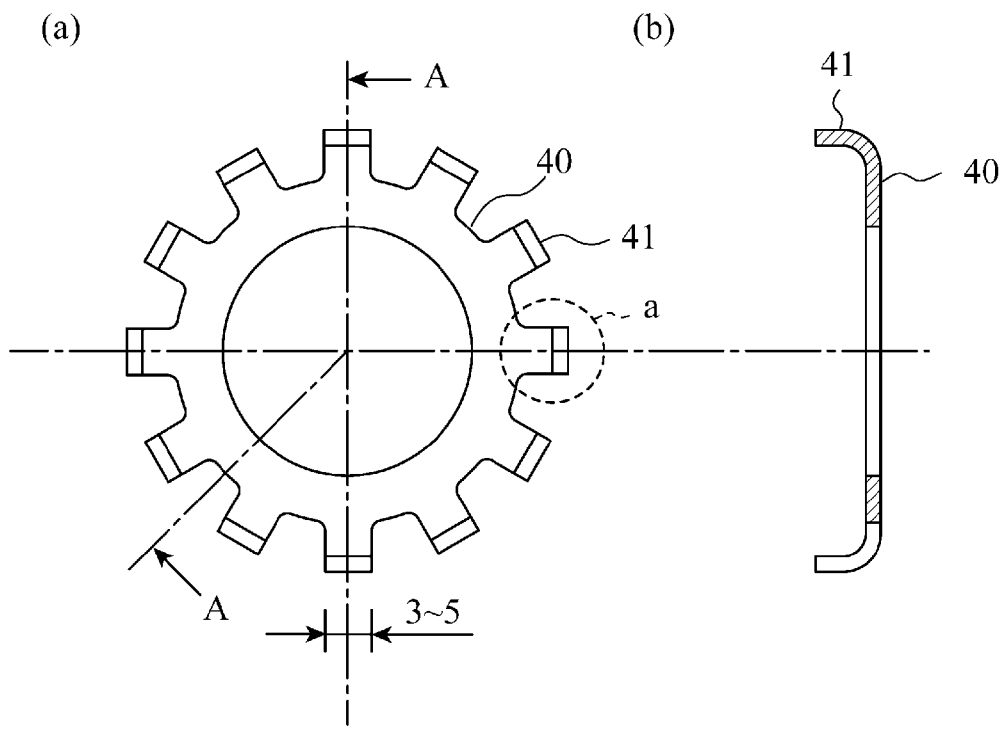
FIG. 2(a) is a plan view of a valve seat in accordance with the first embodiment of the present invention.
FIG. 2(b) is a sectional view thereof along the line A-A.
FIG. 2(c) is an enlarged view of a portion "a."
Figure 2:
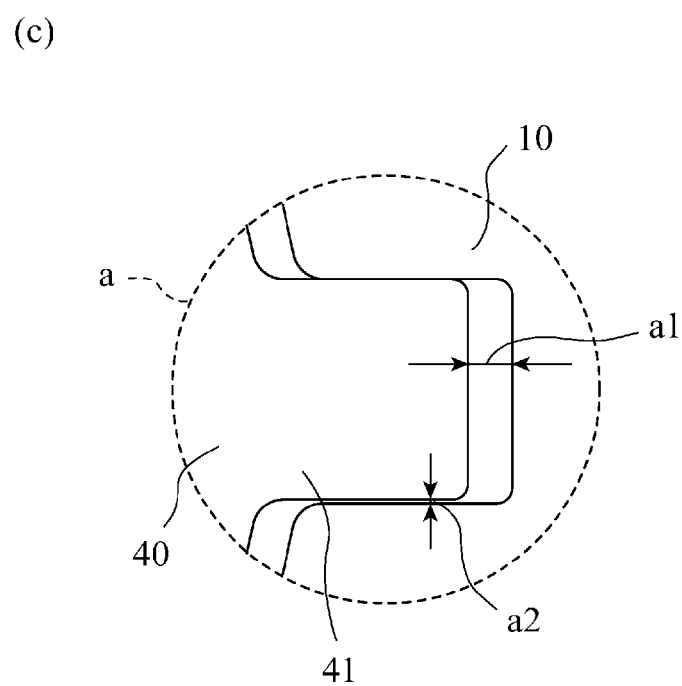

FIG. 2(a) is a plan view of the valve seat 40, FIG. 2(b) is a sectional view thereof along the line A-A, and FIG. 2(c) is an enlarged view of a portion "a" in FIG. 2(a).

As shown in FIG. 2(a), the valve seat 40 is a disk-shaped flat plate having a hole at the center thereof and having twelve rectangular projections 41 that are formed uniformly in the peripheral portion thereof and shaped like a gear. As shown in FIG. 2(b), each of the projections 41 is bent in the direction where the outer diameter of the valve seat 40 reduces. For example, as shown in the figure, the projections 41 are bent substantially orthogonally with respect to the face of the valve seat.

The projections 41 are insert-cast into the housing 10 together with the peripheral portions of the valve seat 40, which renders an integral molding of the valve seat 40 into the housing 10.

When the EGR valve device 1 is subjected to a thermal history from a low temperature to a high temperature, the larger the difference in linear expansion coefficient between the housing 10 and the valve seat 40, and also the larger the outer diameter of the valve seat, the higher the frequency of occurrence of the chattering of the valve seat 40 is. Though a gap occurring between the housing 10 and the valve seat 40 in the diametrical direction is expanded due to the thermal history, a gap occurring in the circumferential direction (the width direction) of the projection 41 is small as compared with that in the diametrical direction.

For example, even in a case where the housing having the valve seat insert-cast therein is subjected to 100 cycles of one thermal cycle of −40° C. (low temperature) for one hour and also +350° C. (high temperature) for one hour, as shown in FIG. 2(c), the difference in linear expansion coefficient between the housing 10 made of aluminum and the valve seat 40 made of stainless steel can increases a gap a1 occurring in the diametrical direction; however, a gap a2 occurring in the circumferential direction is considerably small, as compared with the gap a1 in the diametrical direction. Further, since the movable directions of the other projections 41 provided uniformly due to the gap a1 are different from each other, the valve seat 40 is stabilized by the synergistic effect of the projections 41 to prevent the turning of the valve seat 40, and also prevent the occurrence of the chattering thereof.

In addition, the valve seat 40 having twelve rectangular projections 41 disposed uniformly in the peripheral portion thereof is shown, but the number of projections 41 is not limited to twelve, and the number of projections which is needed for preventing the chattering is to be properly determined.

Figure 3:
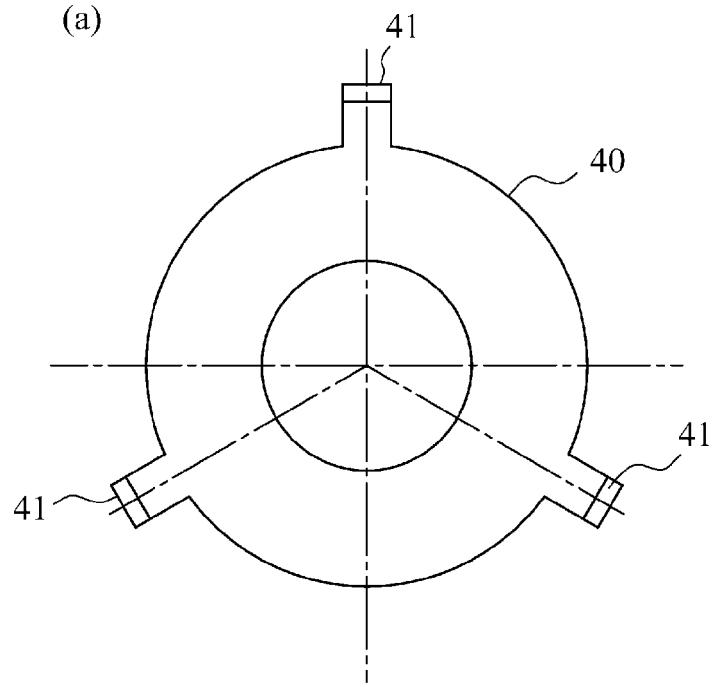
FIG. 3(a) and FIG. 3(b) each are a plan view of a valve seat of another example of in accordance with the first embodiment of the present invention.
Figure 3:
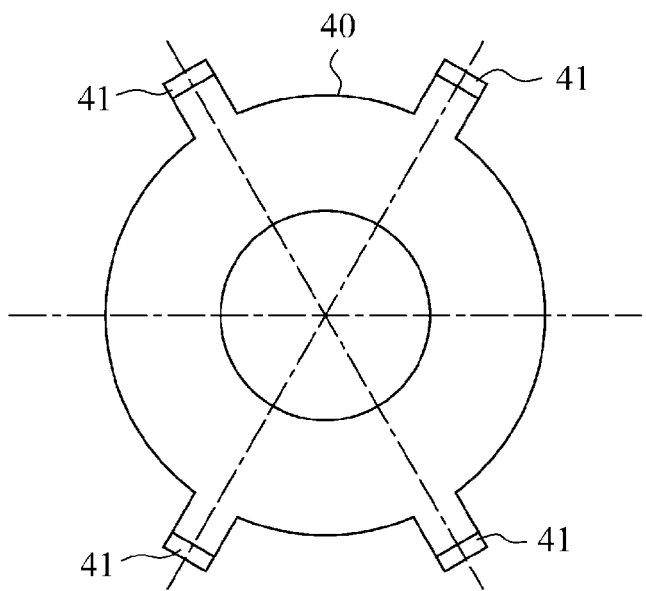

For example, FIG. 3(a) is a plan view showing a valve seat 40 having three rectangular projections 41, and FIG. 3(b) is a plan view showing a valve seat 40 having four rectangular projections 41 axisymmetrically disposed in groups of two.

Even in the valve seat 40 having three rectangular projections 41 disposed uniformly in the peripheral portion thereof as shown in FIG. 3(a), or even in the valve seat 40 having four rectangular projections 41 axisymmetrically disposed in groups of two as shown in FIG. 3(b), the projections can prevent the turning of the valve seat 40, and also prevent the occurrence of the chattering thereof because the directions of the large gaps a1 between the rectangular projections 41 and the housing 10 are different from each other, as in the valve seat 40 shown in FIG. 2(a).

As discussed above, according to the EGR valve device 1 of the first embodiment, the housing 10 is formed integral with the valve seat 40 by providing at least three or more rectangular projections 41 in the peripheral portion of the valve seat 40 and also insert-casting the peripheral portion of the valve seat including the projections 41 into the housing. Thus, the chattering of the valve seat 40 can be prevented; as a result, the leakage of exhaust gas and the damage of the valve seat 40 can be prevented, thereby increasing the longevity of the EGR valve device 1.

It should be understood that an arrangement where each of the rectangular projections 41 provided in the valve seat 40 of the first embodiment is bent halfway is shown; however, even the projections 41 that are not bent can also provide the same effect. However, when the projections 41 are bent, the outer diameter of the EGR valve device 1 can be reduced.

Second Embodiment

In the first embodiment, an arrangement where the rectangular projections 41 are provided in the peripheral portion of the valve seat 40 is discussed, while in the second embodiment, an arrangement where rectangular recesses 42 are provided therein in place of the projections 41 in FIG. 1 will be discussed.

FIG. 4(a) is a plan view of a valve seat 40, FIG. 4(b) is a sectional view thereof along the line B-B, and FIG. 4(c) is an enlarged view of a portion "b" in FIG. 4(a).

It is to be noted that the same or equivalent parts in FIG. 1 to FIG. 3(b) are designated by the same numerals, and these repetitive explanations will be omitted.

As shown in FIGS. 4(a) and 4(b), the valve seat 40 is a disk-shaped flat plate having a hole opened at the center thereof and having four rectangular recesses 42 formed uniformly in the peripheral portion thereof, and the recesses 42 and the peripheral portion of the valve seat 40 are insert-cast into a housing 10 to integrally mold the valve seat 40 in the housing 10.

By arranging the valve seat and the housing in this manner, as shown in FIG. 4(c), the difference of linear expansion coefficient between the housing 10 made of aluminum and the valve seat 40 made of stainless steel increases a gap b1 in the diametrical direction; however, a gap b2 in the circumferential direction is extremely small as compared with the gap b1 in the diametrical direction. Further, the directions where the recesses 42 can travel in their respective gaps b1 are different from each other among the recesses which are formed uniformly therearound, and thus the valve seat 40 does not move by the synergetic effect of the recesses 42. The recesses prevent the turning of the valve seat 40, and also prevent the occurrence of the chattering thereof.

As discussed above, according to the EGR valve device 1 of the second embodiment, the housing 10 is formed integral with the valve seat 40 by providing four rectangular recesses 42 uniformly in the peripheral portion of the valve seat 40 and insert-casting the peripheral portion including those recesses 42 into the housing 10. Thus, the chattering of the valve seat 40 is prevented, and as a result, the leakage of exhaust gas and the damage of the valve seat 40 can be prevented, thereby increasing the longevity of the EGR valve device 1.

Thought it should be appreciated that the valve seat 40 of the second embodiment is arranged to have four recesses 42 provided uniformly in the peripheral portion thereof, the valve seat having provided therein at least three or more rectangular recesses 42 as in the first embodiment can provide the same effect.

Third Embodiment

In the first and second embodiments, an arrangement where the valve seat 40 has at least three or more rectangular projections 41 or recesses 42 provided in the peripheral portion thereof is discussed, while in the third embodiment, an arrangement where a valve seat 40 has non-rectangular projections 41 or recesses 42 provided axisymmetrically in the peripheral portion thereof is discussed.

FIG. 5(a) to FIG. 5(d) are views showing examples of the shapes of projections or recesses provided in the peripheral portion of the valve seat 40. FIG. 6(a) is a plan view of a valve seat 40 employing wedged recesses 42a, FIG. 6(b) is a sectional view thereof along the line C-C, and FIG. 6(c) is an enlarged view of a portion "c" in FIG. 6(a).

It is to be noted that the same or equivalent parts in FIG. 1 to FIG. 4(c) are designated by the same reference numerals, and these explanations will be omitted.

Figure 5:
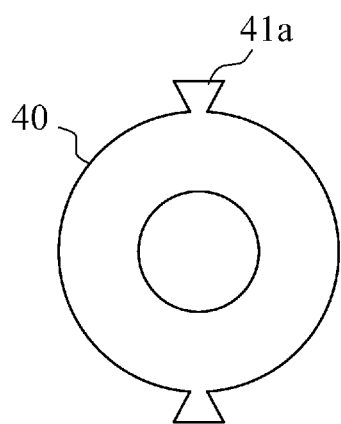
FIG. 5(a) to FIG. 5(d) each are a plan view showing an example of a valve seat in accordance with a third embodiment of the present invention.
Figure 5:
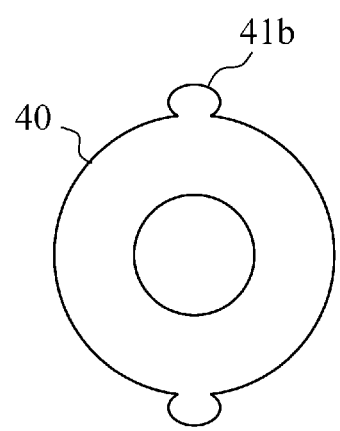
Figure 5:
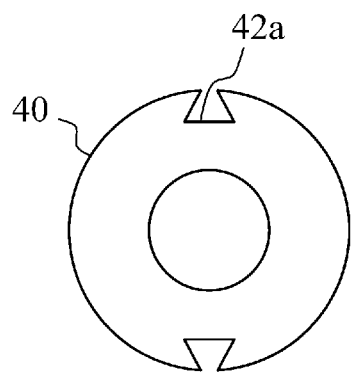
Figure 5:
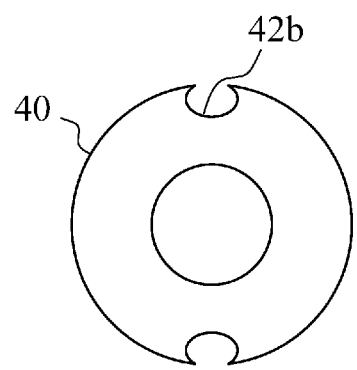

In place of the rectangular projections 41 as shown in FIG. 2(a), the valve seat 40 includes: wedge-shaped projections 41a as a non-rectangular shape formed such that one end of a wedge shape having a larger width projects as shown in FIG. 5(a), or substantially round projections 41b as a non-rectangular shape as shown in FIG. 5(b).

Figure 4:
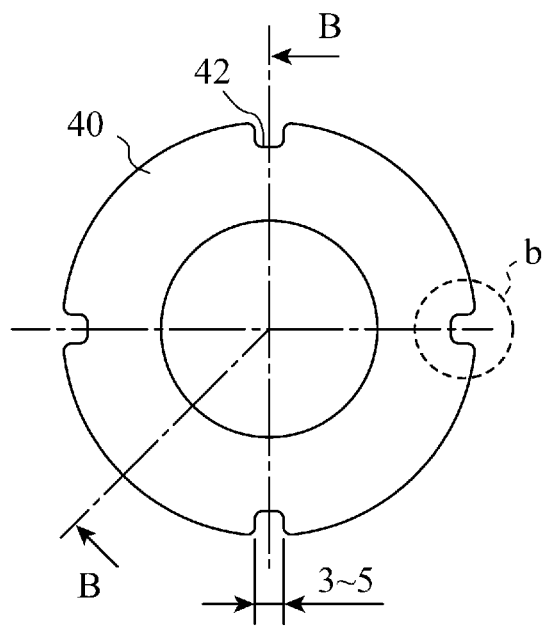
FIG. 4(a) is a plan view of a valve seat in accordance with a second embodiment of the present invention.
FIG. 4(b) is a sectional view thereof along the line B-B.
FIG. 4(c) is an enlarged view of a portion "b."
Figure 4:
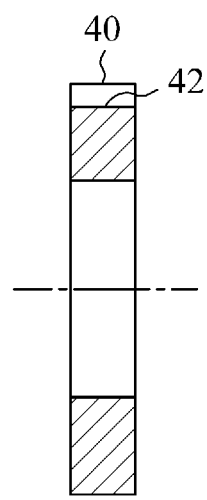
Figure 4:
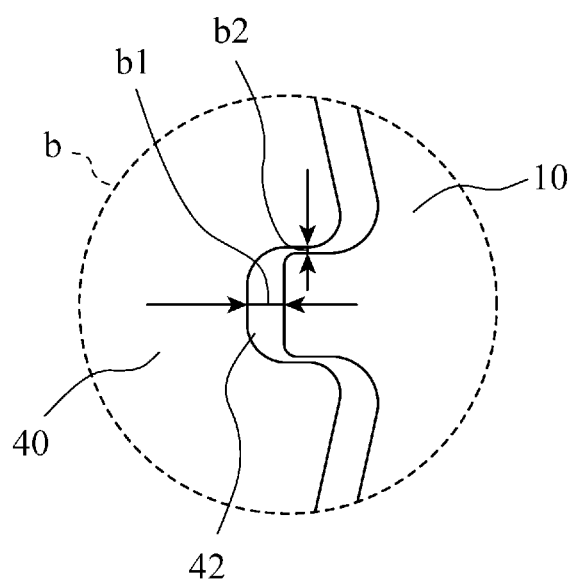

Further, instead of the recesses 42 as shown in FIG. 4, the valve seat includes: wedge-shaped recesses 42a as a non-rectangular shape formed such that one end of a wedge shape having a larger width is placed in a direction where the depth increases as shown in FIG. 5(c), or substantially round recesses 42b as a non-rectangular shape as shown in FIG. 5(d).

In such a way, any one of the non-rectangular projections 41a, 41b and the non-rectangular recesses 42a, 42b is axisymmetrically provided in the peripheral portion of the valve seat 40.

Figure 6:
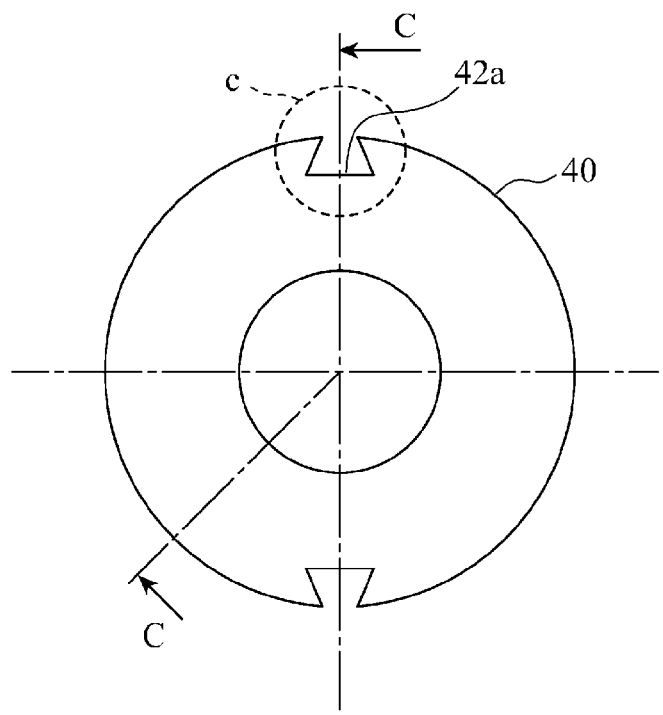
FIG. 6(a) is a plan view of an example of a valve seat in accordance with the third embodiment of the present invention.
FIG. 6(b) is a sectional view thereof along the line C-C.
FIG. 6(c) is an enlarged view of a portion "c."
Figure 6:
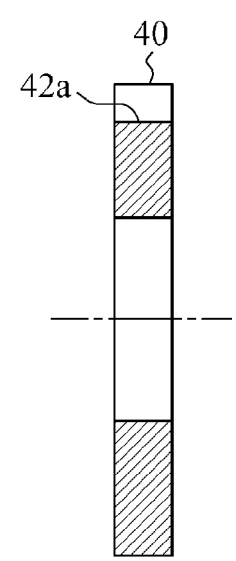
Figure 6:
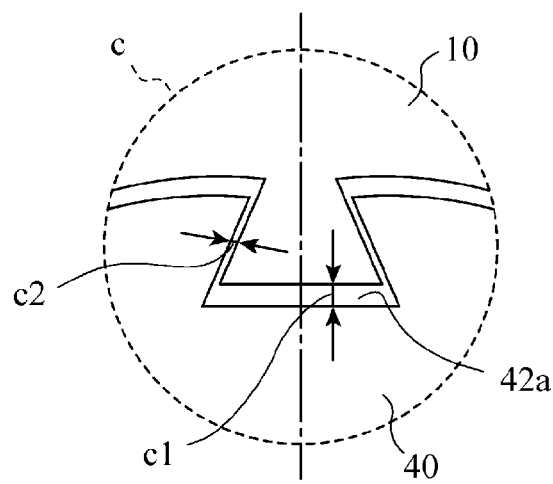
Figure 7:
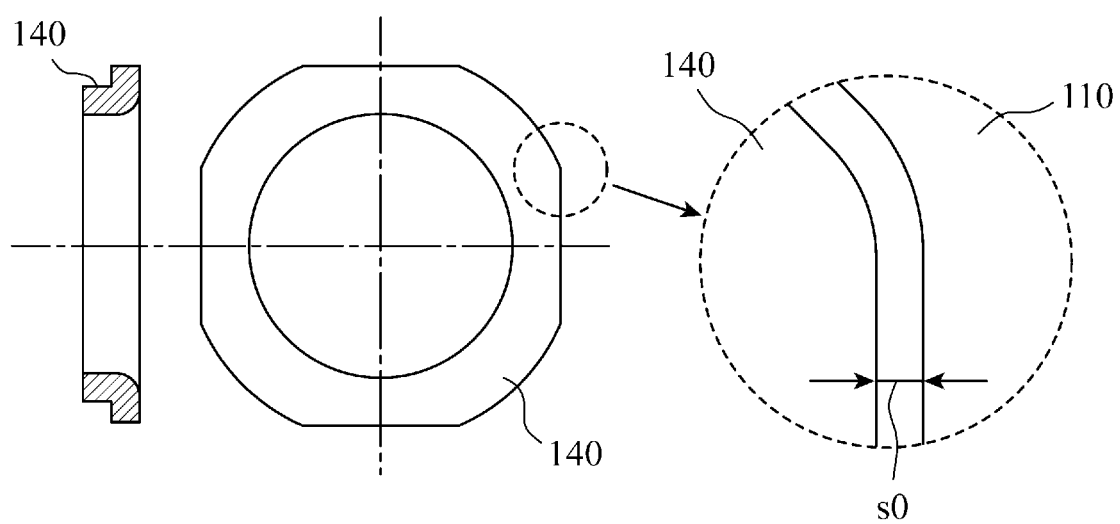
FIG. 7 is a view showing an example of a conventional valve seat.

Next, as a specific example, a description will be given using an arrangement where the wedged recesses 42a as a non-rectangular shape are provided in the valve seat 40, as shown in FIG. 6. The wedged recesses 42a are axisymmetrically formed in the peripheral portion of the valve seat 40 as shown in FIGS. 6(a) and 6(b); for example, the aluminum of a housing 10 made of aluminum is filled in the wedge-shaped recesses 42a. Though a difference in linear expansion coefficient between the aluminum forming the housing 10 and the stainless steel forming the valve seat 40 can form a gap c1 in the contour (in the diametrical direction), the wedge-shaped recess 42a of the valve seat 40 is formed having a tapered shape, and thus a gap c2 formed in the width (in the circumferential direction) is extremely small.

Therefore, since the gap c2 is extremely small as shown in FIG. 6(c), the valve seat 40 does not move in the circumferential direction, and is fixed so as not to move also in the diametrical direction because the tapered faces of the wedged recesses 42a, which are axisymmetrically disposed, are placed in substantially intimate contact with the housing 10.

As discussed above, the valve seat 40 of the third embodiment has axisymmetrically provided in the peripheral portion thereof, non-rectangular wedge-shaped or generally round projections 41a, 41b, or recesses 42a, 42b, and the peripheral portion of the valve seat 40 is insert-cast into the housing 10 to mold the valve seat integral with the housing. Thus, the chattering of the valve seat 40 is prevented. As a result, the leakage of exhaust gas and the damage of the valve seat 40 caused by the falling off thereof or the like can be prevented, thereby increasing the longevity of the EGR valve device 1.

In this connection, in the third embodiment a wedged or substantially round shape is shown as a non-rectangular projection or recess, but it is not limited to the above shape. If the valve seat 40 only has provided in the peripheral portion thereof projections or recesses each having a tapered face or an arcuate face, the same effect will be obtained.

As discussed above, since the EGR valve device according to the present invention is arranged such that a plurality of projections or recesses are provided on the peripheral portion of the valve seat to be formed integral with the housing by insert-casting, the projections or the recesses are buried in the housing, thus preventing the chattering of the valve seat to be caused by the difference in linear expansion coefficient between the valve seat and the housing. As a consequence, the leakage of exhaust gas and the damage of the valve seat due to the falling off thereof or the like can be prevented, thereby increasing the longevity of the EGR valve device 1.

In this connection, it is preferred that the width of the recess 42 be 3 to 5 mm in consideration of the flow of molten metal. When the width is less that 3 mm, the gap is increased because of a poor flow of molten metal, and when the width is larger than 5 mm, the gaps b2 and c2 in the circumferential direction due to a thermal history are expanded, which makes it difficult to produce the effect of preventing the chattering.

Moreover, it is preferred that the difference in linear expansion coefficient between the housing and the valve seat be about $15 \times 10^{-6}/°$ C. or less. If the difference of linear expansion coefficient therebetween is too large, the gap formed between the valve seat and the housing becomes larger, which makes it difficult to produce the effect of preventing the chattering.

The gaps illustrated in figures are, for purposes of explanation, shown in size larger than an actual size.

INDUSTRIAL APPLICABILITY

Even though the EGR valve device of the present invention are subjected to a thermal history, since there is a difference in linear expansion coefficient between the housing and the valve seat, a portion having a small gap between the both can be formed, thereby preventing the chattering of the valve seat, and also preventing the leakage of exhaust gas and/or the damage of the valve seat. Therefore, the EGR valve device is suitable for use in an EGR valve device or the like for leading part of exhaust gas after burning in an internal combustion engine to an intake side thereof to be circulated.

The invention claimed is:
1. An EGR valve device comprising:
a housing having an exhaust gas passage formed inside;
a support shaft slidably supported within the housing through a bearing;
a valve disposed on the support shaft to open and close the exhaust gas passage;
an urging member for urging the support shaft in a direction to close the valve;

a valve seat, insert-cast integral with the housing, for closing the exhaust gas passage by abutting against the valve; and an actuator for driving the support shaft in a direction to open the valve, wherein the valve seat is shaped as a disk with a plurality of diametrical recesses or projections provided axisymmetrically or uniformly in the peripheral portion of the valve seat to be insert-cast, such that the diameter differs at the recesses or the projections in comparison with the remainder of the perimeter on each face of the valve seat.

2. The EGR valve device according to claim 1, wherein the recesses or projections provided in the peripheral portion of the valve seat have a rectangular shape.

3. The EGR valve device according to claim 1, wherein diametrical projections are provided in the peripheral portion of the valve seat, the projections being bent substantially orthogonal with respect to the face of the valve seat.

4. The EGR valve device according to claim 1, wherein diametrical recesses are provided in the peripheral portion of the valve seat, each of the recesses having a size in circumferential direction of 3 mm or more and 5 mm or less.

5. The EGR valve device according to claim 1, wherein the recesses or projections provided in the peripheral portion of the valve seat have a non-rectangular shape.

6. The EGR valve device according to claim 5, wherein each of the projections has a tapered section formed such that a size in circumferential direction of the projections increase as a distance from center of the valve seat increase.

7. The EGR valve device according to claim 5, wherein each of the recesses has a tapered section formed such that a size in circumferential direction of the recesses decrease as a distance from center of the valve seat increase.

* * * * *